Figure 1:
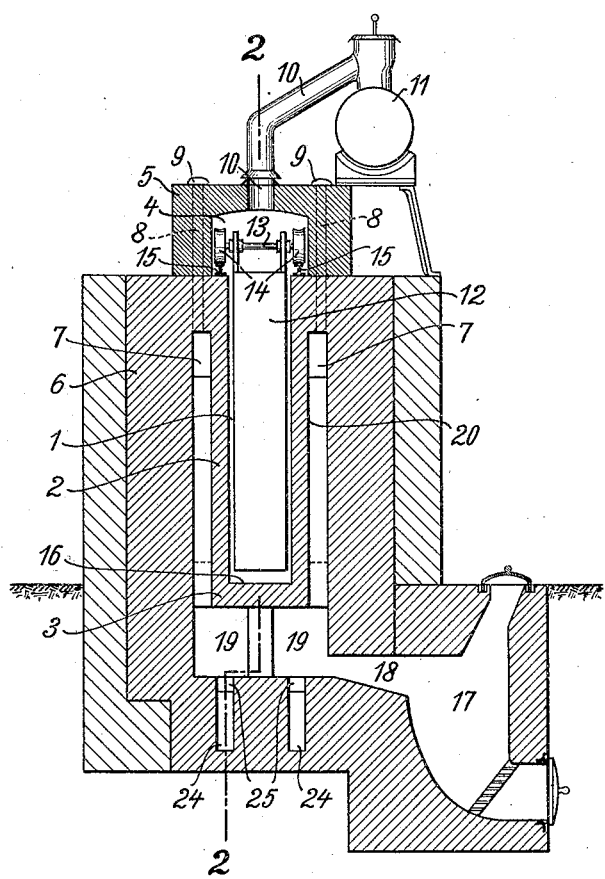

F. RIPPL.
PROCESS OF AND OVEN FOR THE CONTINUOUS DISTILLATION OR GASIFICATION OF ORGANIC MATTER OR MINERALS CONTAINING ORGANIC MATTER.
APPLICATION FILED AUG. 8, 1916.

1,355,268.

Patented Oct. 12, 1920.
3 SHEETS—SHEET 1.

Inventor
Franz Rippl
by John Lotka
Attorney

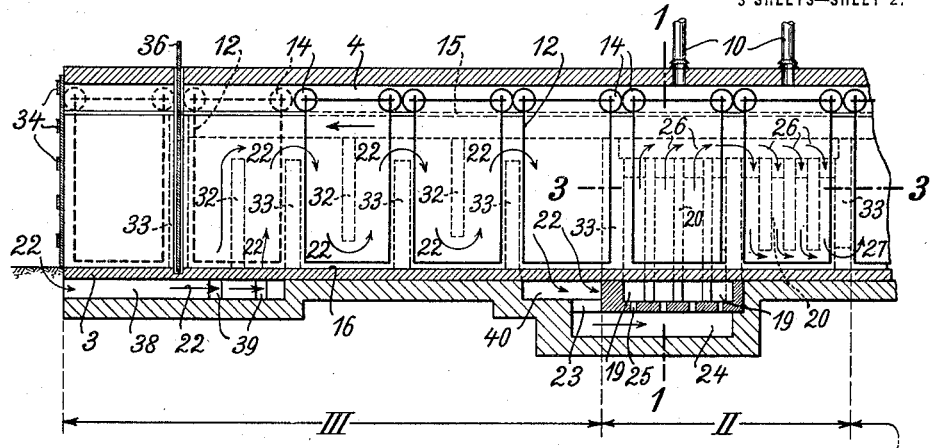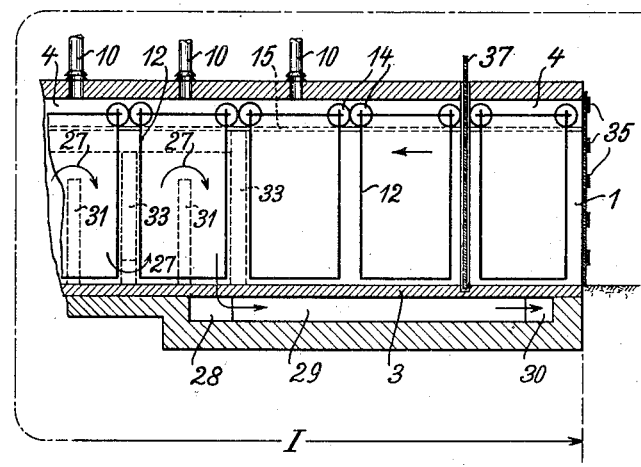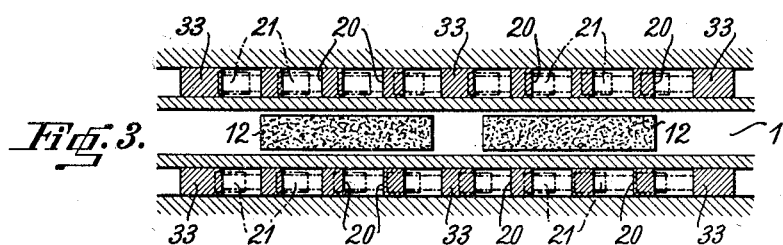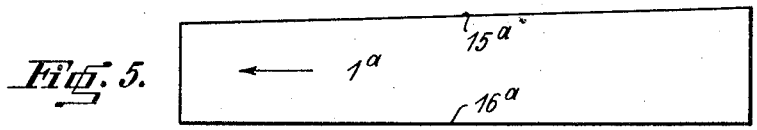

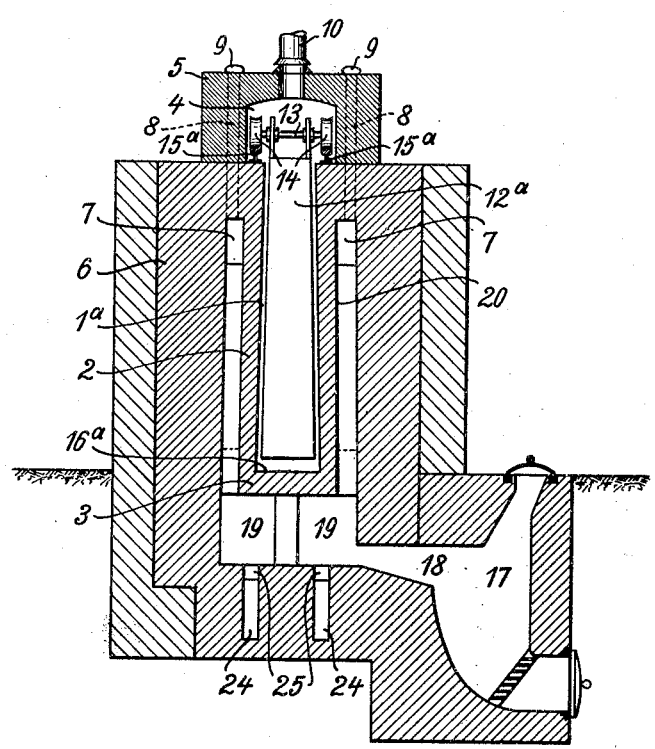

UNITED STATES PATENT OFFICE.

FRANZ RIPPL, OF STETTIN, GERMANY, ASSIGNOR, BY MESNE ASSIGNMENTS, TO THE CHEMICAL FOUNDATION, INC., A CORPORATION OF DELAWARE.

PROCESS OF AND OVEN FOR THE CONTINUOUS DISTILLATION OR GASIFICATION OF ORGANIC MATTER OR MINERALS CONTAINING ORGANIC MATTER.

1,355,268.   Specification of Letters Patent.   Patented Oct. 12, 1920.

Application filed August 8, 1916. Serial No. 113,750.

*To all whom it may concern:*

Be it known that I, FRANZ RIPPL, a citizen of the Austrian Empire, and resident of Stettin, Germany, have invented a new and useful Process of and Oven for the Continuous Distillation or Gasification of Organic Matter or Minerals Containing Organic Matter, of which the following is a specification.

The object of my invention is to distil or gasify organic matter or minerals containing such matter by a continuous and economical treatment. The usual chambered or retort ovens are not suited for the treatment of such material. In particular, my invention is to be employed in the treatment of such material the distillation or gasification temperature of which is at about 500 to 800 degrees centigrade and in any case not much above 800°.

According to my invention the charge is put into suitable receptacles and moved through a passage extending along an oven where it is exposed to indirect heating, being gradually preheated by the waste gases from the furnace of the oven, then distilled or gasified and finally cooled by the combustion air which is conducted along the outside of the passage with the object of preheating such air. In this manner, the charge in the receptacles moves through a preheating, a distillation or gasification and a cooling zone.

The best results are obtained if the preheating as well as the distillation or gasification of the charge is effected by heating the sole and the lateral walls of the passage, and if the cooling of the charge by means of the combustion air—which is simultaneously preheated by the charge—is similarly effected by conducting such air through channels extending along the sole and lateral walls of the said passage. Preferably, at the beginning of the preheating zone, only the sole of the passage is heated, while further on its lateral walls are also heated till finally, at or behind the beginning of the distillation or gasification zone, both its sole and its lateral walls are heated. Similarly, in the cooling zone, the passage is, at that portion where the cooling zone adjoins the distillation or gasification zone, heated both at the sole and the lateral walls, then at the lateral walls only and finally at the sole only. By performing the process in this manner, heat is utilized to the best advantage.

In the construction of the oven in which my improved process is performed, the receptacles for receiving the charge are suspended from cars running on rails provided at the top of the passage. Care is taken that these cars should, as far as practicable, be out of reach of high temperatures by which they would be damaged. Further, particular care is taken to so brace the lateral walls of the passage as to enable them to bear the weight of the cars and receptacles.

Reference is to be had to the accompanying drawings in which I have illustrated a constructional example of an oven in which my improved process may be performed, and in which Figure 1 is a vertical cross section of the oven on line 1—1 of Fig. 2. Fig. 2 is a longitudinal section on line 2—2 of Fig. 1, on a reduced scale, Fig. 3 is a horizontal section on line 3—3 of Fig. 2, drawn to twice the scale of Fig. 2, Fig. 4 is a vertical cross-section of a modified construction of the oven and Fig. 5 is a diagrammatic view illustrating the passage of the oven according to Fig. 4.

The passage 1 of the oven illustrated in Figs. 1 to 3 is divided into three sections or zones I, II and III, section I being the preheating, section II the distillation or gasification and section III the cooling zone for the charge. Accordingly, the passage is, in its several sections, provided with preheating, heating and cooling channels. The passage 1, see Fig. 1, is formed by lateral walls 2, a sole 3 and an upper portion 4 which is extended on either side of the passage and, in the construction illustrated, is formed by a superstructure 5 placed on top of the oven walls. The lateral walls 2 of passage 1 are at some distance from the adjacent walls 6 of the oven and with them form channels 7 which, according to the section in which they are positioned, serve for preheating, heating or cooling respectively. Channels 8 are provided in the superstructure 5 and the wall above channels 7. These channels 8 are at some distance from each other and in communication with channels 7. Their outer ends are closed by bells 9. They may serve for inspection or for regulating the temperature in channels 7. The gases escaping from the charge are removed by pipes 10 communicating with the extended upper portion 4 of passage 1. Pipes 10 may be in communication with a condenser 11.

The receptacles 12 for receiving the charge are preferably made of sheet iron and of rectangular cross section corresponding to that of passage 1. They are open at the top and suspended from the axles 13 of four-wheeled cars the wheels 14 of which run on rails 15 arranged on either side in the extended upper portion 4 of passage 1 so that they, as well as the cars themselves, are out of reach of the heat in passage 1, as far as practicable. The clearance between the receptacles and the lateral walls 2 and the surface 16 of sole 3 of passage 1 should be as small as is compatible with unobstructed movement.

The oven is, in its heating section II, provided with a furnace which, as 17 in Figs. 1 and 2, may be on one side of the oven. The hot gases from the furnace pass into the central flues 19 through channels 18. The flues 19 communicate with channels 7. Vertical partitions 20, see Fig. 2, are arranged in channels 7 so that one set of partitions causes the gases to rise in channels 7 and the other causes them to descend as indicated by arrows 26. The free area of channels 7 between partitions 20 can be regulated as desired, for example by means of dampers 21 made of fire clay which can be displaced so as to reduce or increase the area between partitions 20, see Fig. 3.

The combustion air is introduced in section III, the cooling zone of the oven. It enters by a channel 38 under the sole 3 of passage 1, as indicated by arrow 22 at the left of Fig. 2. From this channel, it passes through transverse passages 39 into channels 7 where vertical partitions 32 and 33 guide it in a zigzag path up and down and along passage 1, see further arrows 22, until it enters a channel 40 under the sole 3 which is situated near the heating zone II, and passes through openings 23 into longitudinal channels 24 which communicate with flues 19 through openings 25 so that it finally gets into channels 7. The furnace gases pass through an opening provided adjacent to the first numeral 27 in the partition 33 which separates the heating from the preheating zone and then follow a zigzag path indicated by the other arrows 27 past partitions 31 and 33 in channels 7 until they reach a transverse channel 28 under the sole of passage 1 whence they pass into a longitudinal channel 29. This channel communicates with another transverse channel 30 which takes the gases to the chimney.

It will be seen by referring to Fig. 2 that section I, the preheating zone of passage 1, has no lateral channels 7 as far as channel 29 extends under its sole 3 while in that portion of section I which adjoins heating section II there is only lateral heating by the channels 7 with their vertical partitions 31 and 33, the sole having no heating channel as far as the lateral channels extend. Section II has only lateral heating channels where it adjoins section I while in its next and hottest portion it has lateral heating channels as well as heating channels underneath, viz., flues 19. Section III, the cooling zone, has cooling channels laterally as well as underneath where it adjoins section II while further on it has cooling channels only laterally and finally only underneath. The combustion air, in the channels 38, 39, 7 and 40, of the cooling zone or section III, flows in opposite direction to that of the charge traveling in receptacles 12 so that it is heated while the charge is cooling.

The vertical partitions 33 in channels 7 serve as bracing pillars for the lateral walls of passage 1 to enable them to bear the weight of the cars running on rails 15 and the receptacles 12 suspended from such cars. The partitions 33 are so constructed that the combustion air or the furnace gases can flow past them, see arrows 22 and 27.

Both ends of passage 1 can be closed by doors 34 and 35. Behind these doors and at a distance from them which somewhat exceeds the length of a receptacle 12 are vertical slides 36 and 37.

The adjacent wheels 14 of the successive cars to which the receptacles 12 are detachably attached engage each other so that all the receptacles can be moved through the passage by pushing one of the cars at one end of the oven.

The operation of the oven is as follows:

When starting, both slides 36 and 37 are raised, and both doors 34 and 35 are closed. Receptacles 12 which have been filled with the material to be treated are successively pushed in at door 35. When one receptacle has passed slide 37, the slide is lowered until the next receptacle passes, etc. The receptacles are then slowly moved along in passage 1 until the first of them reaches door 34. Slide 36 is now lowered, the door is opened and the first receptacle is withdrawn, whereupon slide 36 is raised again and all the receptacles are moved on until the next receptacle reaches door 34, etc.

In the preheating zone, section I of passage 1, the charge is at first heated only from below by means of channel 29 while, as it moves on, it is heated laterally by the furnace gases in channels 7, there being no heating from below in this portion of section I. When entering the distillation or gasification zone, section II, the charge is at first also heated only laterally by the furnace gases descending in channels 7 between partitions 20, see arrows 26, while in that portion of section II to which furnace 17 is connected, an effective heating of the sole 3 as well as of the lateral walls 2 is brought about by the furnace gases flowing upward between partitions 20. On its way through the cooling zone, section III, the distilled or gasified charge is gradually cooled by the combustion air flowing first along the sole and lateral walls, then along the lateral walls only and finally along the sole only, see arrows 22.

Owing to this gradual preheating, distillation or gasification and cooling of the charge, the output of gas obtained is a maximum and the heat is utilized to the best advantage while the wear of the receptacles receiving the charge is greatly reduced. Receptacles made of sheet iron will stand temperatures up to 800° C. without deformation.

However, it is possible that their walls might bulge out under the influence of high temperatures. In order to allow for this bulging and to prevent receptacles from sticking in the passage owing to it, the passage may be constructed with its walls sloping inwardly from the bottom upward, see Fig. 4, so that the passage 1ª is wider at the bottom than at the top. The cross-section of receptacles 12ª is adapted to the cross-section of the passage. The rails 15ª are slightly inclined toward the end of the oven, see Fig. 5. Owing to this arrangement, the receptacles 12ª will, on moving along passage 1ª, descend toward its sole 16ª where the passage is wider and where the receptacle will find sufficient clearance even if its walls should be bulging.

My improved process and apparatus are very economical because the charge need be raised to a low level only and, during treatment, moves exclusively along a horizontal or practically horizontal path. The process is particularly suited for materials that have little or no tendency to clinker, as the material is held in receptacles and, after distillation or gasification, may be transported in them to where it is to be stored or used. For discharging the receptacles, slides or flaps may be provided in their bottoms.

Any organic matter or any minerals containing organic matter that can be utilized in any industry by distillation or gasification, may be treated by my process. For instance, my invention may be employed for the production of gas from coal, wood, peat, straw, sludge, etc.

Instead of a generator furnace as shown, a gas or any other furnace may be provided.

I claim:

1. A process of continuous distillation or gasification of organic matter or minerals containing organic matter by exposing a charge of such material to indirect heating in a passage of an oven, consisting in moving said charge along a passage of said oven in receptacles and preheating, distilling or gasifying and finally, by means of the combustion air supplied to the furnace of said oven, cooling said charge while it is being moved along in said passage, the entire treatment of said charge being effected in the same passage and the charge remaining in said receptacles during the entire treatment, said passage being, during preheating of the charge, heated only at its sole and then only at its lateral walls while, during the distillation or gasification of the charge, said passage is heated at its sole as well as at its lateral walls.

2. A process of continuous distillation or gasification of organic matter or minerals containing organic matter by exposing a charge of such material to indirect heating in a passage of an oven, consisting in moving said charge along a passage of said oven in receptacles and preheating, distilling or gasifying and finally, by means of the combustion air supplied to the furnace of said oven, cooling said charge while it is being moved along in said passage, the cooling being effected by stages the temperatures of which are adapted to be regulated and the entire treatment of said charge being effected in the same passage and the charge remaining in said receptacles during the entire treatment, said passage being, during the cooling of said charge, cooled at its sole and its lateral walls, then at its lateral walls only and finally at its sole only.

3. A process of continuous distillation or gasification of organic matter or minerals containing organic matter by exposing a charge of such material to indirect heating in a passage of an oven, consisting in moving said charge along a passage of said oven in receptacles and preheating, distilling or gasifying and finally, by means of the combustion air supplied to the furnace of said oven, cooling said charge while it is being moved along in said passage, the entire treatment of said charge being effected in the same passage and the charge remaining in said receptacles during the entire treatment, said passage being, during preheating of the charge, heated only at its sole and then only at its lateral walls while, during the distillation or gasification of the charge, said passage is heated at its sole as well as at its lateral walls and during the cooling of said charge it is cooled at its sole and its lateral walls, then at its lateral walls only and finally at its sole only.

4. In an oven in which the process of continuous distillation or gasification of organic matter or minerals containing organic matter is to be performed a passage, a furnace, means for moving the charge along within said passage and channels adapted to remove the products of combustion from and to supply fresh air to said furnace, said channels being arranged at the sole and lateral walls of the passage at and near to that portion of the passage where the furnace is situated, at its lateral walls only at some distance from the said portion of the passage and at its sole only at either end of the passage.

5. In an oven in which the process of continuous distillation or gasification of organic matter or minerals containing organic matter is to be performed a passage, a furnace, means for moving the charge along within said passage and means for heating and cooling said passage, the upper portion of said passage being formed by an extended superstructure, and rails arranged in said superstructure on either side of said passage.

6. In an oven in which the process of continuous distillation or gasification of organic matter or minerals containing organic matter is to be performed a passage, a furnace, means for moving the charge along within said passage, and channels arranged within the side walls of said passage and adapted to remove the products of combustion from and to supply fresh air to said furnace, supports arranged at the upper portions of said side walls, for carrying said charge-moving means and bracing pillars arranged in said channels at the lateral walls of said passage.

7. In an oven in which the process of continuous distillation or gasification of organic matter or minerals containing organic matter is to be performed a passage, a furnace, means for moving the charge along within said passage and means for heating and cooling said passage, the upper portion of said passage being formed by an extended superstructure, and rails arranged in said superstructure on either side of said passage, said rails being arranged at an incline and said passage being wider at the bottom than at the top.

8. The herein described process which consists in passing material which yields gas upon the application of heat, through a single chamber in which the material is first heated exclusively from below, then exclusively from the sides, then both from the sides and from below, whereupon said material is cooled both from the sides and from below, then from the sides exclusively, and finally from the bottom exclusively.

9. An oven for the purpose described, comprising a chamber through which the material is adapted to travel, said chamber being provided with a furnace adjacent to its intermediate portion, with heating channels which extend from said furnace toward the material-receiving end of the chamber and adjacent to the furnace extend along a plurality of the walls of said chamber, while as they approach the inlet, said channels are adjacent to a smaller wall-surface, and cooling channels arranged along the said chamber from said furnace toward the discharge end for the material, said cooling channels being adjacent to a plurality of the walls of said chamber adjacent to said furnace, and adjacent to a smaller wall-surface toward the material-discharge end.

10. An oven for the purpose described, comprising a chamber through which the material is adapted to travel, a furnace located adjacent to the intermediate portion of said chamber, cooling channels for supplying air to said furnace to support combustion therein, said cooling channels extending from the material-discharge end of the chamber to said furnace and in contact with a progressively larger wall-surface as they approach the furnace, and heating channels extending from said furnace to the material-receiving end of the chamber and in contact with a progressively-decreasing wall-surface as they are farther away from the furnace.

11. An oven for the purpose described, comprising a chamber widening downwardly, and lengthwise of which the material is adapted to travel, tracks extending lengthwise of said chamber at the upper portion thereof and inclined downwardly from the material-receiving end to the material-discharge end, so that material carried in receptacles suspended from said tracks, will gradually pass to the wider lower portion of said chamber as the material approaches the discharge end, and means for heating the material as it travels through said chamber.

12. An oven for the purpose described, comprising a downwardly-widening longitudinal chamber through which the material is adapted to travel, downwardly-widening receptacles for said material, extending into said chamber, and means for heating the material in said downwardly widening receptacles, as they travel through said chamber.

13. An oven for the purpose described, comprising a chamber through which the material is adapted to travel, spaced tracks arranged at the upper portion of said chamber, receptacles depending into the chamber from said tracks, heating channels in the side walls of said chambers, below said tracks, and bracing walls in said heating channels, to assist in supporting said tracks.

In testimony whereof, I have signed this specification.

FRANZ RIPPL.

Witnesses:
WALTER PICRUDY,
EMIL SCHMIDT.